C. A. VANDERVELL & A. H. MIDGLEY.
SELF REGULATING DYNAMO ELECTRIC MACHINE.
APPLICATION FILED JULY 8, 1913.

1,088,489.

Patented Feb. 24, 1914.

WITNESSES
W. B. Brock
M. A. Hood

INVENTORS
C. A. Vandervell
A. H. Midgley
BY Brock Decker Smith
ATTORNEY

UNITED STATES PATENT OFFICE.

CHARLES ANTHONY VANDERVELL AND ALBERT HENRY MIDGLEY, OF ACTON VALE, ENGLAND.

SELF-REGULATING DYNAMO-ELECTRIC MACHINE.

1,088,489. Specification of Letters Patent. Patented Feb. 24, 1914.

Application filed July 8, 1913. Serial No. 777,914.

*To all whom it may concern:*

Be it known that we, CHARLES ANTHONY VANDERVELL and ALBERT HENRY MIDGLEY, subjects of the King of Great Britain and Ireland, and residing at Warple Way, Acton Vale, in the county of Middlesex, England, have invented certain new and useful Improvements in and Relating to Self-Regulating Dynamo-Electric Machines, of which the following is a specification.

This invention relates to self-regulating dynamo electric machines and more particularly to dynamo machines used for train and car lighting purposes in conjunction with a battery of accumulators.

The machine constructed according to the present invention comprises main and supplementary poles and main and supplementary brushes, the main poles being provided with an ordinary shunt or series excitation or with a constant excitation and each of the supplementary poles being excited by means of a winding, the two ends of which are connected to a main and supplementary brush respectively, the position of these brushes being such that they span the armature conductors under the supplementary poles, and the windings on the latter poles being wound in such a sense with respect to the brushes to which they are connected that they produce a field acting in opposition to the armature cross field produced by the armature conductors under the main poles, said armature cross field being greater than the opposing field, of the supplementary poles, thus determining the direction of the field of the supplementary poles.

Figure 1:
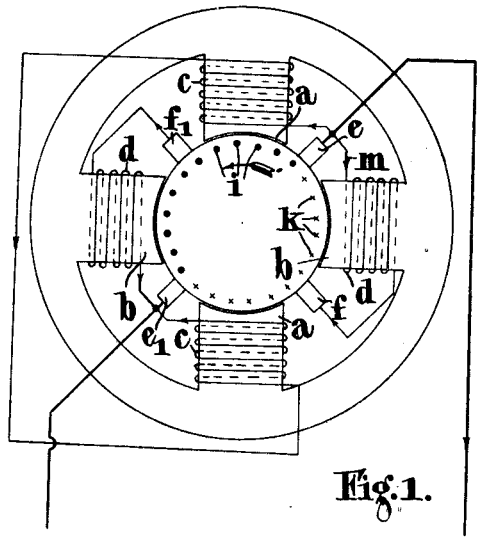
Figure 2:
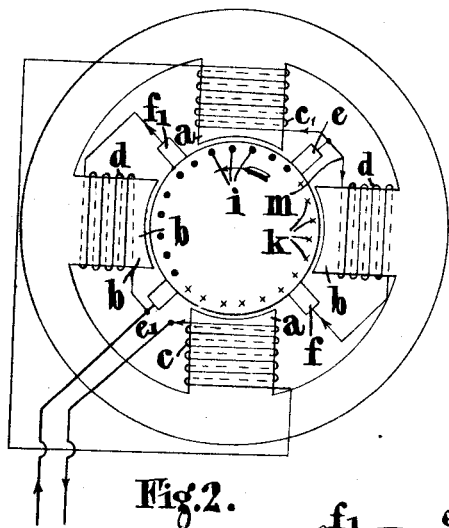

The invention is illustrated by way of example in the accompanying drawings in which:

Figure 1 shows a machine in which the main poles are provided with ordinary shunt windings, Fig. 2 a machine in which the main poles are provided with ordinary series windings, and Figs. 3-7 are diagrams showing the various fluxes produced in the machine and illustrating the working of the same at various stages of its operation.

Referring to Figs. 1 and 2, $a$ $a$ are main poles, $b$ $b$ supplementary poles, $c$ $c$ ordinary shunt windings (in the form of construction shown in Fig. 1) and $c'$ $c'$ ordinary series windings (in the form of construction shown in Fig. 2) provided on the main poles, $d$ $d$ windings provided on the supplementary poles, $e$ $e_1$ main brushes and $f$ $f_1$ supplementary brushes. The two ends of each excitation winding $d$ mounted on the supplementary pole $b$ are connected to the main brush $e$ and supplementary brush $f$ respectively.

Figure 3:
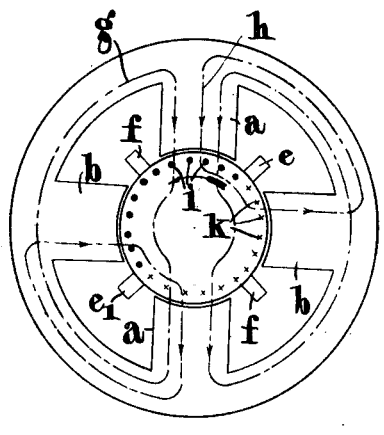

In a machine constructed according to this invention two fields are produced when the machine rotates, viz., a main flux which passes through the yoke, the main poles and the armature and an auxiliary flux which passes through the yoke and the armature and through a main and supplementary pole, the auxiliary flux acting in the main poles in the same direction as the main flux. This is illustrated in Fig. 3 in which $g$ represents the main flux and $h$ the auxiliary flux when the machine is rotated in the direction indicated by the arrow.

The operation of the machine is as follows: When the armature is rotated in the direction of the arrow the electromotive force generated in the conductors $i$ under the main poles $a$ has such a direction that the current which is taken off the main brushes $e$ $e_1$ and which passes through the windings $c$ on the poles $a$ excites the latter poles by reinforcing the residual magnetism. The residual magnetism of the poles $b$ (Fig. 4) has the direction of the arrow $j$ and is weakened while the speed is increased since the windings $d$ are wound on the poles $b$ in such a direction that the current generated in the armature conductors $k$ which are under the supplementary poles, by the residual magnetism flows through the windings $d$ first in the direction indicated by the arrow $l$, that is to say in a direction opposite to that indicated by the arrow $m$ in Fig. 1 and the field produced by this current acts in the direction of the arrow $n$, that is to say, in opposition to that of the residual magnetism. The field produced by the current flowing through the armature conductors $i$ acts also in opposition to the residual magnetism of the poles $b$ and overcomes the same gradually as the speed of the machine increases, so that now a current is produced in the conductors $k$ which flows through the windings $d$ in the direction of the arrow $m$ and produces a field which acts in opposition to the field of the armature conductors $i$. This stage of the operation of the machine is diagrammatically illustrated in Fig. 5, in which the arrow $o$ indicates the direction of the armature cross flux and the arrow $p$ the direction of the field produced by the windings $d$. As the potential difference between the brushes $e$ and $f$ spanning the armature conductors $k$ increases, the current flowing through the windings $d$ in the direction of the arrow $m$ increases, whereby the field of the winding $d$, which acts in the direction of the arrow $p$, that is to say in opposition to the field of the armature conductors $i$, is correspondingly increased. The working current taken off the brushes $e$ and $e_1$ passes through the armature conductors $k$ and thereby produces a field which acts in opposition to the field of the main poles $a$.

If the speed of the machine, after the latter has attained its normal working speed, is increased, the electromotive force induced in the armature conductors $i$ is also increased, the result being that the field of the armature conductors $i$ acting in the direction of the arrow $o$ is increased. In consequence thereof the potential difference between the brushes $e$ and $f$ spanning the armature conductors $k$ is also increased and therefore also the current flowing through the winding $d$ in the direction indicated by the arrow $m$ is increased. This current produces a field which acts in opposition to the field of the armature conductors $i$. At the same time the potential difference between the brushes $e$ and $f$ spanning the armature conductors $k$ is increased merely because of the increase of speed apart from the increase due to the increase of the field of the armature conductors $i$. The field of the winding $d$ acting in the direction of the arrow $p$ increases faster than the field of the armature conductors $i$ which acts in opposition thereto, that is to say in the direction of the arrow $o$, so that the resulting auxiliary field $h$ (Fig. 3) is rapidly diminished when the speed is increased.

Figure 6:
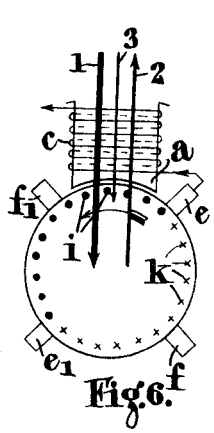
Figure 7:
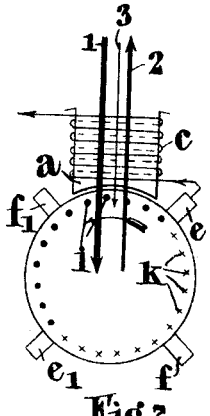
Figure 4:
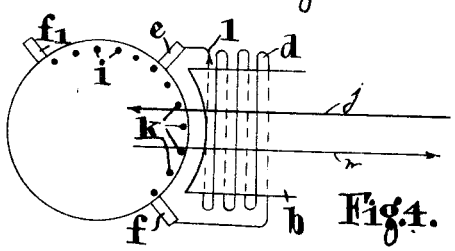
Figure 5:
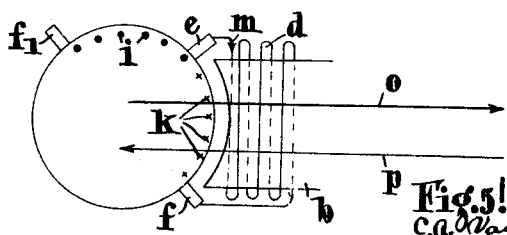

In Figs. 6 and 7 arrow 1 represents the direction of the main field produced by the excitation winding $c$ on the main pole $a$, arrow 2 the direction of the demagnetizing field produced by the current flowing through the armature conductors $k$, and arrow 3 the direction in the main pole of the auxiliary flux $h$. Fig. 6 illustrates the position when the machine has attained its normal working speed while Fig. 7 illustrates when compared with Fig. 6 the decrease and increase of the various fluxes when the speed of the machine is increased beyond the normal speed, these changes being indicated by the different thickness of the arrows 1, 2 and 3.

Instead of constructing the machine with projecting supplementary poles, such projecting poles may be dispensed with by arranging the windings producing a field in opposition to the armature cross field by means of windings arranged on the yoke of the machine.

Having now described our invention, what we claim as new and desire to secure by Letters Patent is:—

1. A dynamo electric machine having main and supplementary poles, excitation windings on the main and supplementary poles, an armature and armature conductors thereon, and main and supplementary brushes arranged between the main and supplementary poles, the two ends of the winding mounted on each of the supplementary poles being connected to a main and supplementary brush arranged between the supplementary poles and the adjacent main poles respectively and the supplementary brushes being entirely disconnected from the windings on the main poles, as and for the purpose set forth.

2. A dynamo electric machine having main and supplementary poles, an armature and armature conductors thereon, main and supplementary brushes arranged between the main and supplementary poles, ordinary shunt excitation windings mounted on the main poles and connected to the main brushes and excitation windings mounted on the supplementary poles, the two ends of the winding mounted on each supplementary pole being connected to a main and supplementary brush arranged between the supplementary poles and the adjacent main poles respectively, and the supplementary brush being entirely disconnected from the shunt excitation windings, as and for the purpose set forth.

3. A dynamo electric machine having main and supplementary poles, main and supplementary brushes arranged between the main and supplementary poles, an armature and armature conductors thereon, excitation windings mounted on the main poles, and excitation windings mounted on the supplementary poles the two ends of the winding mounted on each of the supplementary poles being connected to the main and supplementary brush arranged between the supplementary poles and the adjacent main poles respectively, the supplementary brush being entirely disconnected from the excitation windings on the main poles and the direction of the winding on each of the supplementary poles being such as to produce a field of opposite direction to that of, and smaller than, the field due to the armature conductors lying under the main poles, as and for the purpose set forth.

In testimony whereof we have signed our names to this specification in the presence of two subscribing witnesses.

CHARLES ANTHONY VANDERVELL.
ALBERT HENRY MIDGLEY.

Witnesses:
JOHN HETTINGER,
BENTON H. MATTHEWS.